United States Patent [19]

Klatskin et al.

[11] Patent Number: 5,437,712
[45] Date of Patent: Aug. 1, 1995

[54] METHODS FOR INHIBITING DEPOSITION AND FOULING IN SCRUBBER SYSTEMS

[75] Inventors: Stuart D. Klatskin, Aurora; Robert F. Brazier, Wadsworth, both of Ohio

[73] Assignee: Betz Laboratories, Inc., Trevose, Pa.

[21] Appl. No.: 204,575

[22] Filed: Mar. 1, 1994

[51] Int. Cl.$^6$ .............................................. B01D 47/06
[52] U.S. Cl. ..................................... 95/234; 210/699; 210/701; 252/180
[58] Field of Search ................................ 210/698–701; 252/180; 423/226, 245.1, 245.2, 215.5; 95/234

[56] References Cited

U.S. PATENT DOCUMENTS

| | | | |
|---|---|---|---|
| 3,880,620 | 4/1975 | Lange et al. | 95/234 |
| 3,887,340 | 6/1975 | Hsu et al. | 95/234 |
| 4,560,481 | 12/1985 | Hollander | 210/697 |
| 4,671,880 | 6/1987 | Wisener et al. | 210/699 |
| 4,717,499 | 1/1988 | Chen | 252/181 |
| 4,869,845 | 9/1989 | Chen | 252/181 |
| 4,900,451 | 2/1990 | Brown et al. | 210/699 |
| 5,256,302 | 10/1993 | Perez et al. | 210/699 |

*Primary Examiner*—Peter A. Hruskoci
*Attorney, Agent, or Firm*—Alexander D. Ricci; Philip H. Von Neida

[57] ABSTRACT

A method for inhibiting the deposition of zinc, iron, and mixed zinc-iron metals on the metal surfaces of a scrubber system comprising adding to said scrubber system a water soluble polymer having repeat units (a) and (b) of the structure

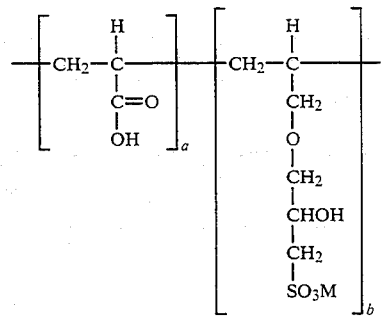

wherein M is a water soluble cation. This invention is particularly effective at inhibiting zinc, iron, and mixed zinc-iron deposition on the metal surfaces of the fan, fan shroud and mist eliminator of the scrubber system.

5 Claims, No Drawings

METHODS FOR INHIBITING DEPOSITION AND FOULING IN SCRUBBER SYSTEMS

FIELD OF THE INVENTION

This invention provides for methods for inhibiting deposition and fouling in scrubber systems used in steelmaking processes.

BACKGROUND OF THE INVENTION

Scrap metal consists of byproducts of steel fabrication containing iron and steel. Scrap is one of the two main sources of metallics in steelmaking and is increasingly proving a great practical value. With the advent of environmental regulations and controls and the economics of energy conservation and recycling, the use of scrap metal in steelmaking is becoming more desirable.

One area where this use is increased is in the use of scrap galvanized steel. This material is less expensive than non-galvanized scrap, but its use also has its drawbacks which can offset the economic advantages of lower cost.

As the galvanized scrap steel is heated and melted, gases are emitted at temperatures in excess of 2800° F. These gases pass to a scrubber system to separate air from the solids present along with the gases. This would constitute spraying water into the hot gases present in the scrubber system to wash out the solids.

The use of scrap galvanized steel poses a problem in that zinc is present in the steel as a result of the galvanizing process. As the galvanized steel is heated, zinc is emitted along with gases and is present as the gases enter the scrubber facility. The zinc is prone to deposition on the metal surfaces in the scrubber system, notably the fan, fan shroud and mist eliminators. This is especially problematic in basic oxygen furnaces (BOF) suppressed combustion (SC) systems where there is a limited amount of oxygen present.

This deposition can be costly as there are necessary frequent shut downs of the fans and mist eliminators for cleaning, both mechanical and chemical. The present inventors have discovered a method for inhibiting this zinc, iron, and mixed zinc-iron deposition while the scrubber system is running during normal steelmaking operations.

SUMMARY OF THE INVENTION

The present inventors have discovered a method for inhibiting the deposition of zinc, iron, and mixed zinc-iron metals in scrubber systems associated with steelmaking operations. The deposition of these metals can be inhibited by adding to the scrubber system a water soluble copolymer of acrylic acid/allyl hydroxy propyl sulfonate ether (AA/AHPSE).

DESCRIPTION OF THE RELATED ART

U.S. Pat. No. 4,869,845, Chen, utilizes the same copolymer as the present invention to treat scale and corrosion problems in cooling water and boiler water systems. The copolymer is employed in conjunction with a phosphonate and a zinc compound.

U.S. Pat. No. 4,560,481, Hollander, teaches using an AA/AHPSE copolymer to inhibit deposition and corrosion due to iron present in a cooling water system.

U.S. Pat. No. 4,671,880, Wisener et al., teaches that certain AA/AHPSE copolymers inhibit deposition and fouling in cooling water systems due to the presence of aluminum.

U.S. Pat. No. 4,900,451, Brown et al. teaches inhibiting manganese deposition in an open, recirculating aqueous system using an AA/AHPSE copolymer and an organic phosphonate compound.

DETAILED DESCRIPTION OF THE INVENTION

In accordance with the invention, disclosed are methods for inhibiting the deposition of zinc, iron, and mixed zinc-iron metals on the metal surfaces of scrubber systems in a steelmaking system wherein said metals are present in said scrubber system as a result of heating zinc-containing and iron-containing metals during the course of steelmaking comprising adding to said scrubber system a water soluble copolymer having repeat units (a) and (b) of the structure

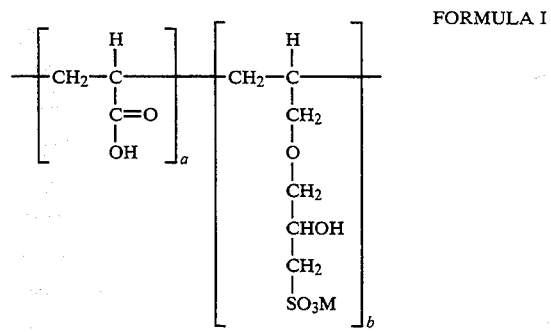

FORMULA I

M is a water soluble cation. This polymer is referred to as acrylic acid/allyl hydroxy propyl sulfonate ether (AA/AHPSE). The IUPAC nomenclature for AHPSE is 1-propane sulfonic acid, 2-hydroxy-3-(2 propenyloxy) mono sodium salt.

The number average molecular weight of the water soluble copolymers of FORMULA 1 may fall within the range of 1,000 to 1,000,000. Preferably the number average molecular weight will be within the range of from about 1,500 to about 10,000 being even more highly desirable. The key criterion is that the polymer be water soluble.

The molar ratio a:b of the monomers of FORMULA 1 may fall within the range of between about 30:1 to 1:20, with the a:b molar ratio range of from about 10:1 to 1:5 being preferred.

With respect to both repeat units of the polymers of the present invention, they may exist in acid or water soluble salt form when used in the desired water system.

As to preparation of the monomer designated as a above, in FORMULA 1 above, it may be produced by reacting allyl alcohol with a non-tertiary alcohol in the temperature range of about 25°–150° C. as detailed in U.S. Pat. No. 2,847,477 (the entire disclosure of which is hereby incorporated by reference) followed by, if desired, sulfonation, phosphorylation, phosphonation or carboxylation of the monomer via well-known techniques.

The preferred allyl hydroxyl propyl sulfonate ether monomers (monomer b, FORMULA 1 ) may conveniently be prepared via a ring opening reaction of the epoxy group of an allyl glycidyl ether precursor. Sulfonation of the epoxy group with sodium sulfite in the presence of a phase transfer catalyst such as a tetra-n-butyl ammonium bisulfite or with fuming sulfuric acid containing sulfur trioxide will produce the sulfonic acid group and hydroxy group of the AHPSE. The resulting monomer can be further neutralized with caustic or other basic material.

The reaction is illustrated by the following mechanism:

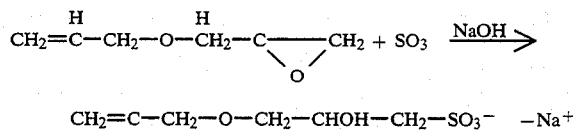

$$CH_2=C-CH_2-O-CH_2-CHOH-CH_2-SO_3^- \quad -Na^+$$

It should be noted that monomer b may itself be allyl glycidyl ether which is commercially available from several sources. Suitable cations, M, include Na+, NH$_4$+, Ca+$^2$ and K+.

After the desired monomers have been obtained, free radical chain addition polymerization may proceed in accordance with conventional solution polymerization techniques. Polymerization initiators such as persulfate initiators, peroxide initiators, etc. may be used. Preferably the requisite monomers are mixed with water and alcohol (preferably isopropanol). The resulting polymer may be isolated by well-known methods such as distillation, etc. or the polymer may simply be used in its aqueous solution.

The copolymers of the present invention can be added to the scrubber system in an amount which is sufficient to inhibit the deposition of zinc, iron, and zinc-iron metals during operation of the scrubbing system. The copolymers may be added to the scrubber system in an amount ranging from about 1.0 to about 250 parts per million parts water present in the scrubber. Preferably, the copolymers are added in a range from about 200 parts to about 250 parts per million parts water employed in the scrubber. Greater dosages may be employed but it is anticipated that efficiency of inhibiting metal deposition may be effected.

The copolymers of the present invention are preferably added to the scrubber system in an aqueous solvent. The addition of the copolymers is preferably done by spraying the aqueous solution of the copolymer onto the affected metal surfaces during operation of the scrubber system. It is thought that inputting the aqueous solution of the copolymer prior to the scrubber system will also inhibit zinc, iron and zinc-iron metal deposition.

The particular areas of the scrubber system where the copolymers of the present invention are most effective at inhibiting zinc deposition are the fan, fan shroud and mist eliminator. These components are primarily composed of steel such as mild or carbon steel and other iron-based metallurgies. It is anticipated that any metal surface in the scrubber system that is prone to zinc and iron deposition will be effectively treated by the inventive copolymers.

The copolymers of the present invention can also be employed with other compatible treatments. These treatments can include calcium and iron deposition inhibitors, such as HEDP, and corrosion inhibitors.

The data set forth below demonstrate the unexpected results occasioned by use of this invention. The following examples are included as being an illustration of the invention and should not be construed as limiting the scope thereof.

Example

A mid-eastern steel manufacturer began employing a larger percentage of scrap galvanized steel in their raw material mix. This created a severe fouling problem due to zinc and iron deposition in the fan, fan shroud, and mist eliminator area of the basic oxygen furnace suppressed combustion system.

An initial treatment designated Inhibitor A was started on the #2 vessel. This treatment solution comprised 50.95% H$_2$O
1.05% solid caustic soda
4.0% HEDP
44.0% AA/AHPSE HEDP is 1-(hydroxyethylidene) diphosphonic acid. AA/AHPSE is acrylic acid/allyl hydroxy propyl sulfonate ether having a molecular weight of $3 \times 10^3$ with a 3:1 molar ratio.

On April 1, 200 to 250 parts per million of the Inhibitor A solution in the 60 gallon per minute flow of steel plant cooling water was sprayed into the fan housing. On April 14, a visual inspection of the fan, fan shroud and mist eliminators showed they were exceptionally clean of zinc, iron, and mixed zinc-iron deposits. Another inspection was performed on April 23 and this also showed the fan and mist eliminators to be clean with some deposits present which proved soft and easily removed as opposed to fairly tenacious pre-treatment deposits.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for inhibiting the deposition of zinc, iron, and mixed zinc-iron metals on the metal surfaces of scrubber systems in a steelmaking system wherein said zinc and iron metals are present in said scrubber system as a result of heating zinc-containing and iron-containing metals during the course of steelmaking wherein said scrubber system has a fan housing, fan, fan shroud, and mist eliminator located therein, comprising adding to said scrubber system a water soluble copolymer having repeat units (a) and (b) of the structure

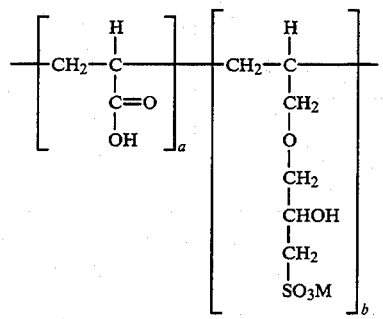

wherein M is a water soluble cation, the molar ratio of the repeat units a:b of said polymer being between about 30:1 to 1:20, the number average molecular weight of said polymer being between 1,000 and 1,000,000 wherein said water soluble copolymer is added to said scrubber system by spraying water containing an effective amount of said copolymer into said fan housing to inhibit the deposition of zinc, iron, and mixed zinc-iron metals on the metal surfaces of said fan, fan shroud, and mist eliminator.

2. The method as claimed in claim 1 wherein the molar ratio of said repeat units a:b is from about 10:1 to 1:5.

3. The method as claimed in claim 1 wherein the molar ratio of said repeat units a:b is about 3:1.

4. The method as claimed in claim 1 wherein said water soluble copolymer is added to said scrubber system in an amount ranging from about 1.0 part to about 250 parts per million parts water present in the scrubber.

5. The method as claimed in claim 1 wherein said metal surfaces are comprised of iron-based metallurgies.

* * * * *